: US 9,618,014 B2
(12) United States Patent
Morris et al.

(10) Patent No.: US 9,618,014 B2
(45) Date of Patent: Apr. 11, 2017

(54) IMPLEMENT SYSTEM HAVING HYDRAULIC START ASSIST

(71) Applicant: Caterpillar Inc., Peoria, IL (US)

(72) Inventors: Emily Anne Morris, Peoria, IL (US); Jeremy Todd Peterson, Washington, IL (US); Jeffrey Lee Kuehn, Germantown Hills, IL (US); Dayao Chen, Bolingbrook, IL (US); Pengfei Ma, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 14/263,710

(22) Filed: Apr. 28, 2014

(65) Prior Publication Data

US 2015/0247304 A1    Sep. 3, 2015

Related U.S. Application Data

(60) Provisional application No. 61/946,452, filed on Feb. 28, 2014.

(51) Int. Cl.
*F16D 31/02* (2006.01)
*F15B 1/02* (2006.01)
(Continued)

(52) U.S. Cl.
CPC .............. *F15B 1/024* (2013.01); *E02F 3/425* (2013.01); *E02F 9/2217* (2013.01); *F02N 7/08* (2013.01);
(Continued)

(58) Field of Classification Search
CPC .... F15B 1/024; F15B 1/022; F15B 2211/214; F15B 2211/851
See application file for complete search history.

(56) References Cited

U.S. PATENT DOCUMENTS 4,959,962 A    10/1990  Hagin et al.
6,431,050 B1 *  8/2002  Hausman .............. E02F 9/2221
                                                    91/526
(Continued)

FOREIGN PATENT DOCUMENTS

DE    102011104921    10/2012
EP        1790781 B1    10/2008
(Continued)

OTHER PUBLICATIONS

U.S. Appl. No. 13/770,858 entitled "Energy Recovery System for Hydraulic Machine" filed Feb. 19, 2013.
(Continued)

*Primary Examiner* — Thomas E Lazo
*Assistant Examiner* — Daniel Collins
(74) *Attorney, Agent, or Firm* — Finnegan, Henderson, Farabow, Garrett & Dunner, LLP

(57) ABSTRACT

An implement system is disclosed for use with a machine having an engine. The implement system may have a pump driven by the engine, a first actuator configured to receive pressurized fluid from the pump during operation of the engine, and at least a second actuator configure to receive pressurized fluid from the pump during operation of the engine. The implement system may also have an accumulator configured to receive pressurized fluid from the first actuator during operation of the engine, and to discharge fluid to the first actuator and to the at least a second actuator when the engine is shut down.

20 Claims, 7 Drawing Sheets

(51) Int. Cl.

| | | |
|---|---|---|
| *F04B 35/00* | (2006.01) | |
| *E02F 3/42* | (2006.01) | |
| *E02F 9/22* | (2006.01) | |
| *F02N 7/08* | (2006.01) | |
| *F15B 21/14* | (2006.01) | |
| *F02N 11/00* | (2006.01) | |
| *F04B 17/05* | (2006.01) | |
| *B60K 6/12* | (2006.01) | |

(52) U.S. Cl.
CPC .............. *F02N 11/00* (2013.01); *F04B 17/05* (2013.01); *F04B 35/002* (2013.01); *F15B 21/14* (2013.01); *B60K 2006/126* (2013.01); *F02N 2300/2002* (2013.01); *F15B 2211/20523* (2013.01); *F15B 2211/20546* (2013.01); *F15B 2211/212* (2013.01); *F15B 2211/7053* (2013.01); *F15B 2211/7058* (2013.01); *F15B 2211/7135* (2013.01); *F15B 2211/851* (2013.01); *F15B 2211/853* (2013.01)

(56) References Cited

U.S. PATENT DOCUMENTS

| | | | |
|---|---|---|---|
| 6,973,781 | B2 | 12/2005 | Brown et al. |
| 7,273,122 | B2 | 9/2007 | Rose |
| 7,744,499 | B2 | 6/2010 | Stecklein |
| 8,209,975 | B2 | 7/2012 | Persson et al. |
| 8,408,341 | B2 | 4/2013 | Dalum et al. |
| 2008/0110166 | A1* | 5/2008 | Stephenson ........... E02F 9/2217 60/414 |
| 2011/0017164 | A1 | 1/2011 | Larson |
| 2011/0118963 | A1 | 5/2011 | Baur et al. |
| 2011/0180287 | A1 | 7/2011 | Stenzel |
| 2013/0111890 | A1 | 5/2013 | Rosth |
| 2013/0263948 | A1 | 10/2013 | Block et al. |
| 2013/0280111 | A1 | 10/2013 | Hoxie et al. |

FOREIGN PATENT DOCUMENTS

| | | |
|---|---|---|
| EP | 2537989 | 6/2011 |
| EP | 2444304 A1 | 4/2012 |
| FR | 2982328 | 5/2013 |
| FR | 2989741 | 10/2013 |
| JP | 2009-270660 A | 11/2009 |
| WO | 2007-044130 A1 | 4/2007 |
| WO | WO 2010/149930 | 12/2010 |
| WO | WO 2012/125798 | 9/2012 |
| WO | WO 2012/127160 | 9/2012 |
| WO | WO 2012/175943 | 12/2012 |
| WO | WO 2013/092374 | 6/2013 |

OTHER PUBLICATIONS

U.S. Patent Application by Emily Anne Morris et al. entitled "Machine Having Hydraulic Start Assist System" filed Apr. 28, 2014.

\* cited by examiner

IMPLEMENT SYSTEM HAVING HYDRAULIC START ASSIST

RELATED APPLICATIONS

This application is based on and claims priority to U.S. Provisional Application No. 61/946,452 filed on Feb. 28, 2014, the contents of which are expressly incorporated herein by reference.

TECHNICAL FIELD

The present disclosure relates generally to an implement system and, more particularly, to an implement system having hydraulic start assist.

BACKGROUND

Hydraulic machines such as excavators, dozers, loaders, backhoes, motor graders, and other types of heavy equipment use one or more hydraulic actuators to accomplish a variety of tasks. These actuators are fluidly connected to an engine-driven pump of the machine that provides pressurized fluid to chambers within the actuators. As the pressurized fluid moves into or through the chambers, the pressure of the fluid acts on hydraulic surfaces of the chambers to affect movement of the actuators and a connected work tool.

One problem associated with this type of hydraulic arrangement involves efficiency. In particular, there may be times when the hydraulic machine is idle and yet still operational. For example, during a truck loading cycle, when an excavator finishes loading a first truck, the excavator must wait for the first truck to depart and a second truck to arrive before additional loading tasks can be completed. And during this time, the engine of the machine may still be turned on (often at high speeds) and needlessly consuming fuel. In these situations, it may be beneficial to selectively turn the engine off to conserve fuel. However, after turning the engine off, it may take some time for the engine to be turned back on and ramp up to required speeds. And this time delay could result in lost productivity and/or become a nuisance for the operator.

An exemplary system for starting and stopping an engine is disclosed in W.O. Patent Application Publication No. 2012/125798 of Lowman et al. that published on Sep. 20, 2012 ("the '798 publication"). Specifically, the '798 publication discloses an engine driven hydraulic system having a first accumulator and a second accumulator connected to a pump that provides pressurized fluid to hydraulic implements. When it is determined that the hydraulic implements have not been activated by operator command for a given amount of time and the accumulators have satisfactory charging levels, fuel to the engine is shut off. As soon as it is determined that hydraulic flow to the implements needs to be resumed due to operator command, fluid stored in the first accumulator is directed through the pump to start the engine. Simultaneously, fluid from the second accumulator is directed to the implements to provide instantaneous operation.

Although the system of the '798 publication may improve machine operation by providing instantaneous use of the implements during engine startup, the system may still be less than optimal. In particular, because the accumulators are dedicated to a single purpose, the system may be bulky and expensive. In addition, because the accumulators are charged only with fluid from the pump, the system may have low efficiency.

The disclosed implement system is directed to overcoming one or more of the problems set forth above and/or other problems of the prior art.

SUMMARY

One aspect of the present disclosure is directed to an implement system for a machine having an engine. The implement system may include a pump driven by the engine, a first actuator configured to receive pressurized fluid from the pump during operation of the engine, and at least a second actuator configure to receive pressurized fluid from the pump during operation of the engine. The implement system may also include an accumulator configured to receive pressurized fluid from the first actuator during operation of the engine, and to discharge fluid to the first actuator and to the at least a second actuator when the engine is shut down.

Another aspect of the present disclosure is directed to a machine. The machine may include a frame, an engine mounted to the frame, a boom, a swing motor configured to swing the boom relative to the frame, and a boom cylinder configured to raise and lower the boom relative to the frame. The machine may also include a stick, a stick cylinder configured to pivot the stick relative to the boom, a work tool, and a tool cylinder configured to pivot the work tool relative to the stick. The machine may also include a common supply passage connected to the swing motor, the boom cylinder, the stick cylinder, and the tool cylinder; and a pump driven by the engine to supply pressurized fluid to common supply passage. The machine may further include a swing accumulator configured to receive pressurized fluid from the swing motor and direct pressurized fluid back to the swing motor during operation of the engine, a boom accumulator configured to receive pressurized fluid from the boom cylinder and direct pressurized fluid back to the boom cylinder during operation of the engine, and a startup accumulator configured to receive pressurized fluid from at least one of the swing motor, the swing accumulator, the boom cylinder, and the boom accumulator during operation of the engine, and to direct pressurized fluid to the common supply passage when the engine is shut down or starting up.

DETAILED DESCRIPTION

Figure 1:
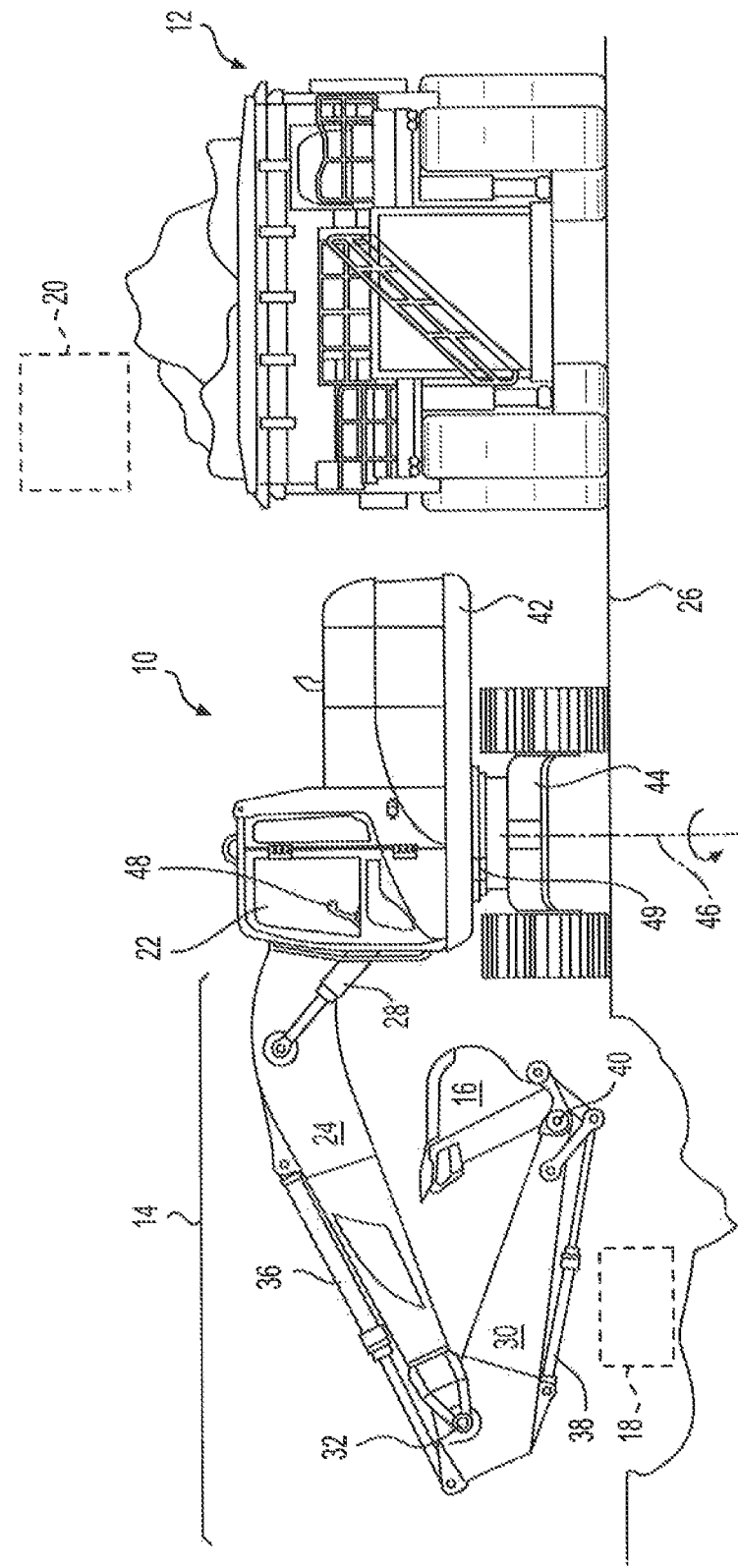
FIG. 1 is an isometric illustration of an exemplary disclosed machine.

FIG. 1 illustrates an exemplary machine 10 having multiple systems and components that cooperate to excavate and load material onto a nearby haul vehicle 12. In the depicted example, machine 10 is a hydraulic excavator. It is contemplated, however, that machine 10 could alternatively embody another excavation or material handling machine, such as a backhoe, a front shovel, a dragline excavator, a crane, or another similar machine. Machine 10 may include, among other things, an implement system 14 configured to move a work tool 16 between a dig location 18 within a trench or at a pile, and a dump location 20, for example over haul vehicle 12. Machine 10 may also include an operator station 22 for manual control of implement system 14. It is contemplated that machine 10 may perform operations other than truck loading, if desired, such as craning, trenching, and material handling.

Implement system 14 may include a linkage structure acted on by fluid actuators to move work tool 16. Specifically, implement system 14 may include a boom 24 that is vertically pivotal relative to a work surface 26 by a pair of adjacent, double-acting, hydraulic cylinders 28 (only one shown in FIG. 1). Implement system 14 may also include a stick 30 that is vertically pivotal about a horizontal pivot axis 32 relative to boom 24 by a single, double-acting, hydraulic cylinder 36. Implement system 14 may further include a single, double-acting, hydraulic cylinder 38 that is operatively connected to work tool 16 to tilt work tool 16 vertically about a horizontal pivot axis 40 relative to stick 30. Boom 24 may be pivotally connected to a frame 42 of machine 10, while frame 42 may be pivotally connected to an undercarriage member 44 and swung about a vertical axis 46 by one or more swing motors 49. Stick 30 may pivotally connect work tool 16 to boom 24 by way of pivot axes 32 and 40. It is contemplated that a greater or lesser number of fluid actuators may be included within implement system 14 and connected in a manner other than described above, if desired.

Numerous different work tools 16 may be attachable to a single machine 10 and controllable via operator station 22. Work tool 16 may include any device used to perform a particular task such as, for example, a bucket, a fork arrangement, a blade, a shovel, a crusher, a shear, a grapple, a grapple bucket, a magnet, or any other task-performing device known in the art. Although connected in the embodiment of FIG. 1 to lift, swing, and tilt relative to machine 10, work tool 16 may alternatively or additionally rotate, slide, extend, open and close, or move in another manner known in the art.

Operator station 22 may be configured to receive input from a machine operator indicative of a desired work tool movement. Specifically, operator station 22 may include one or more input devices 48 embodied, for example, as single or multi-axis joysticks located proximal an operator seat (not shown). Input devices 48 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor(s) 49. It is contemplated that different input devices may alternatively or additionally be included within operator station 22 such as, for example, wheels, knobs, push-pull devices, switches, pedals, and other operator input devices known in the art.

Figure 2:
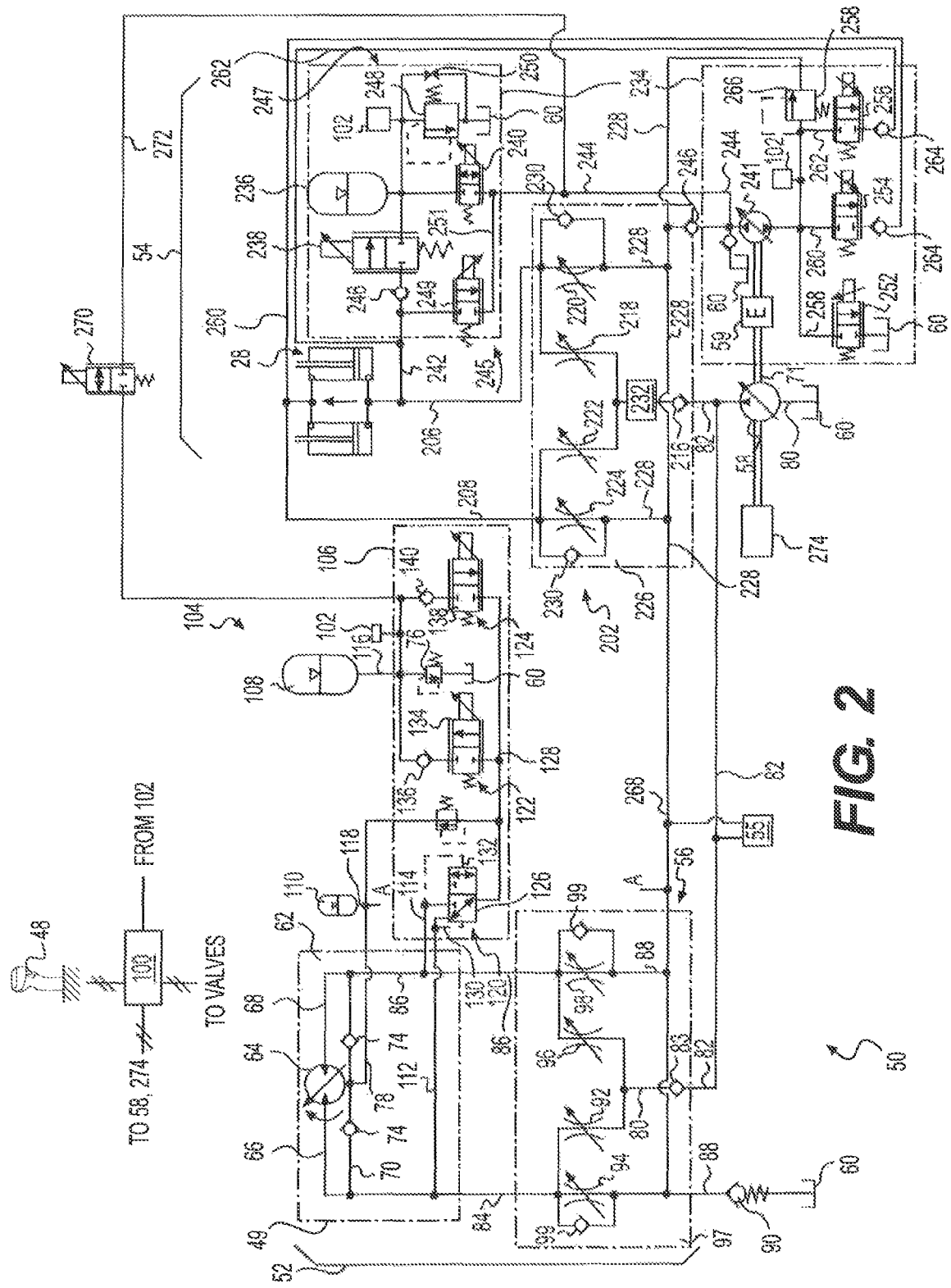
FIG. 2 is a schematic illustration of an exemplary disclosed implement system that may be used in conjunction with the machine of FIG. 1.

As illustrated in FIG. 2, machine 10 may include a hydraulic circuit 50 having a plurality of fluid components that cooperate to move implement system 14 (referring to FIG. 1). In particular, hydraulic circuit 50 may include a swing circuit 52 associated with swing motor 49, a boom circuit 54 associated with hydraulic cylinders 28, and at least one other circuit 55 associated with hydraulic cylinders 36 and 38.

Swing circuit 52 may include, among other things, a swing control valve 56 connected to regulate a flow of pressurized fluid from a pump 58 to swing motor(s) 49 and from swing motor(s) 49 to a low-pressure tank 60. This fluid regulation may function to cause a swinging movement of work tool 16 about axis 46 (referring to FIG. 1) in accordance with an operator request received via input device 48. It should be noted that, while only a single swing motor 49 is shown in FIG. 2, any number of parallel swing motors 49 may be utilized.

Each swing motor 49 may include a housing 62 at least partially forming a first and a second chamber (not shown) located to either side of an impeller 64. When the first chamber is connected to an output of pump 58 (e.g., via a first chamber passage 66 formed within housing 62) and the second chamber is connected to tank 60 (e.g., via a second chamber passage 68 formed within housing 62), impeller 64 may be driven to rotate in a first direction (shown in FIG. 2). Conversely, when the first chamber is connected to tank 60 via first chamber passage 66 and the second chamber is connected to pump 58 via second chamber passage 68, impeller 64 may be driven to rotate in an opposite direction (not shown). The flow rate of fluid through impeller 64 may relate to a rotational speed of swing motor 49, while a pressure differential across impeller 64 may relate to an output torque thereof.

Swing motor 49 may include built-in makeup functionality. In particular, a makeup passage 70 may be formed within housing 62, between first chamber passage 66 and second chamber passage 68, and a pair of opposing check valves 74 may be disposed within makeup passage 70. A low-pressure passage 78 may be connected to makeup passage 70 at a location between check valves 74. Based on a pressure differential between low-pressure passage 78 and first and second chamber passages 66, 68, one of check valves 74 may open to allow fluid from low-pressure passage 78 into the lower-pressure one of the first and second chambers. A significant pressure differential may generally exist between the first and second chambers during a swinging movement of implement system 14.

Pump 58 may be driven by an engine 59 of machine 10 to draw fluid from tank 60 via an inlet passage 80, pressurize the fluid to a desired level, and discharge the fluid into swing circuit 52 via a common discharge or supply passage 82. A check valve 83 may be disposed within discharge passage 82, if desired, to provide for a unidirectional flow of pressurized fluid from pump 58 into swing circuit 52. Pump 58 may embody, for example, a variable displacement pump (shown in FIG. 2), a fixed displacement pump, or another source known in the art. Pump 58 may be drivably connected to engine 59 or to another power source of machine 10 by, for example, a countershaft 71, a belt, or in another suitable manner. Alternatively, pump 58 may be indirectly connected to engine 59 of machine 10 via a torque converter, a reduction gear box, an electrical circuit, or in any other suitable manner. Pump 58 may produce a stream of pressurized fluid having a pressure level and/or a flow rate determined, at least in part, by demands of the actuator(s) within swing circuit 52 that correspond with operator requested movements. Discharge passage 82 may be connected within swing circuit 52 to first and second chamber passages 66, 68 via swing control valve 56 and first and second chamber conduits 84, 86, respectively, which extend between swing control valve 56 and swing motor 49.

Tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic circuits within machine 10 may draw fluid from and return fluid to tank 60. It is contemplated that hydraulic circuit 50 may be connected to multiple separate fluid tanks (shown in FIG. 2) or to a single tank, as desired. Tank 60 may be fluidly connected to swing control valve 56 via a return passage 88, and to first and second chamber passages 66, 68 via swing control valve 56 and first and second chamber conduits 84, 86, respectively. One or more check valves 90 may be disposed within return passage 88, if desired, to promote a unidirectional flow of fluid into tank 60 and/or to maintain a desired return flow pressure.

Swing control valve 56 may have elements that are movable to control the rotation of swing motor 49 and corresponding swinging motion of implement system 14. Specifically, swing control valve 56 may include a first chamber supply element 92, a first chamber drain element 94, a second chamber supply element 96, and a second chamber drain element 98 all disposed within a common block or housing 97. The first and second chamber supply elements 92, 96 may be connected in parallel to discharge passage 82 to regulate filling of their respective chambers with fluid from pump 58, while the first and second chamber drain elements 94, 98 may be connected in parallel to return passage 88 to regulate draining of the respective chambers of fluid. A makeup valve 99, for example a check valve, may be disposed between discharge passage 82 and an outlet of first chamber drain element 94 and between discharge passage 82 and an outlet of second chamber drain element 98.

To drive swing motor 49 to rotate in the first direction, first chamber supply element 92 may be shifted to allow pressurized fluid from pump 58 to enter the first chamber of swing motor 49 via discharge passage 82 and first chamber conduit 84, while second chamber drain element 98 may be shifted to allow fluid from the second chamber of swing motor 49 to drain to tank 60 via second chamber conduit 86 and return passage 88. To drive swing motor 49 to rotate in the opposite direction, second chamber supply element 96 may be shifted to communicate the second chamber of swing motor 49 with pressurized fluid from pump 58, while first chamber drain element 94 may be shifted to allow draining of fluid from the first chamber of swing motor 49 to tank 60. It is contemplated that both the supply and drain functions of swing control valve 56 (i.e., of the four different supply and drain elements) may alternatively be performed by a single valve element associated with the first chamber and a single valve element associated with the second chamber, or by a single valve element associated with both the first and second chambers, if desired.

Supply and drain elements 92-98 of swing control valve 56 may be solenoid-movable against a spring bias in response to a flow rate and/or position command issued by a controller 100. In particular, swing motor 49 may rotate at a velocity that corresponds with the flow rate of fluid into and out of the first and second chambers. Accordingly, to achieve an operator-desired swing speed, a command based on an assumed or measured pressure drop may be sent to the solenoids (not shown) of supply and drain elements 92-98 that causes them to open an amount corresponding to the necessary rate of fluid flow into and out of swing motor 49. This command may be in the form of a flow rate command or a valve element position command that is issued by controller 100. It is contemplated that one or more of valves 92-98 could alternatively be pilot operated and/or pilot assisted, if desired.

Swing circuit 52 may be fitted with an energy recovery module (ERM) 104 that is configured to selectively extract and recover energy from waste fluid that is discharged by swing motor 49. ERM 104 may include, among other things, a recovery valve block (RVB) 106 that is fluidly connectable to swing motor 49, a swing accumulator 108 configured to selectively communicate with swing motor 49 via RVB 106, and a makeup accumulator 110 also configured to selectively and directly communicate with swing motor 49. In the disclosed embodiment, RVB 106 may be fixedly and mechanically connectable to one or both of swing control valve 56 and swing motor 49, for example directly to housing 62 and/or directly to housing 97. RVB 106 may include an internal first passage 112 fluidly connectable to first chamber conduit 84, and an internal second passage 114 fluidly connectable to second chamber conduit 86. Swing accumulator 108 may be fluidly connected to RVB 106 via a conduit 116, while makeup accumulator 110 may be fluidly connectable to low-pressure passage 78 in parallel with tank 60 (see connection A), via a conduit 118.

RVB 106 may house a selector valve 120, a charge valve 122 associated with swing accumulator 108, a discharge valve 124 associated with swing accumulator 108 and disposed in parallel with charge valve 122, and a relief valve 76. Selector valve 120 may automatically fluidly communicate one of first and second passages 112, 114 with charge and discharge valves 122, 124 based on a pressure of first and second passages 112, 114. Charge and discharge valves 122, 124 may be selectively movable in response to commands from controller 100 to fluidly communicate swing accumulator 108 with selector valve 120 for fluid charging or discharging purposes. Relief valve 76 may be selectively connected to an outlet of swing accumulator 108 and/or a downstream side of charge valve 122 with tank 60 to relieve pressures of hydraulic circuit 50.

Selector valve 120 may be a pilot-operated, 2-position, 3-way valve that is automatically movable in response to fluid pressures in first and second passages 112, 114 (i.e., in response to a fluid pressures within the first and second chambers of swing motor 49). In particular, selector valve 120 may include a valve element 126 that is movable from a first position (shown in FIG. 2) at which first passage 112 is fluidly connected to charge and discharge valves 122, 124 via an internal passage 128, toward a second position (not shown) at which second passage 114 is fluid connected to charge and discharge valves 122, 124 via passage 128. When first passage 112 is fluidly connected to charge and discharge valves 122, 124 via passage 128, fluid flow through second passage 114 may be inhibited by selector valve 120, and vice versa. First and second pilot passages 130, 132 may communicate fluid from first and second passages 112, 114 to opposing ends of valve element 126 such that a higher-pressure one of first or second passages 112, 114 may cause valve element 126 to move and fluidly connect the corresponding passage with charge and discharge valves 122, 124 via passage 128.

Charge valve 122 may be a solenoid-operated, variable position, 2-way valve that is movable in response to a command from controller 100 to allow fluid from passage 128 to enter swing accumulator 108. In particular, charge valve 122 may include a valve element 134 that is movable from a first position (shown in FIG. 2) at which fluid flow from passage 128 into swing accumulator 108 is inhibited, toward a second position (not shown) at which passage 128 is fluidly connected to swing accumulator 108. When valve element 134 is away from the first position (i.e., in the second position or in an intermediate position between the first and second positions) and a fluid pressure within passage 128 exceeds a fluid pressure within swing accumulator 108, fluid from passage 128 may fill (i.e., charge) swing accumulator 108. Valve element 134 may be spring-biased toward the first position and movable in response to a command from controller 100 to any position between the first and second positions to thereby vary a flow rate of fluid from passage 128 into swing accumulator 108. A check valve 136 may be disposed between charge valve 122 and swing accumulator 108 to provide for a unidirectional flow of fluid into swing accumulator 108 via charge valve 122.

Discharge valve 124 may be substantially identical to charge valve 122 in composition, and selectively movable in response to a command from controller 100 to allow fluid from swing accumulator 108 to enter passage 128 (i.e., to discharge). In particular, discharge valve 124 may include a valve element 138 that is movable from a first position (shown in FIG. 2) at which fluid flow from swing accumulator 108 into passage 128 is inhibited, toward a second position (not shown) at which swing accumulator 108 is fluidly connected to passage 128. When valve element 138 is away from the first position (i.e., in the second position or in an intermediate position between the first and second positions) and a fluid pressure within swing accumulator 108 exceeds a fluid pressure within passage 128, fluid from swing accumulator 108 may flow into passage 128. Valve element 138 may be spring-biased toward the first position and movable in response to a command from controller 100 to any position between the first and second positions to thereby vary a flow rate of fluid from swing accumulator 108 into passage 128. A check valve 140 may be disposed between swing accumulator 108 and discharge valve 124 to provide for a unidirectional flow of fluid from swing accumulator 108 into passage 128 via discharge valve 124.

A pressure sensor 102 may be associated with swing accumulator 108 and configured to generate signals indicative of a pressure of fluid within swing accumulator 108, if desired. In the disclosed embodiment, pressure sensor 102 may be disposed between swing accumulator 108 and discharge valve 124. It is contemplated, however, that pressure sensor 102 may alternatively be disposed between swing accumulator 108 and charge valve 122 or directly connected to swing accumulator 108, if desired. Signals from pressure sensor 102 may be directed to controller 100 for use in regulating operation of charge and/or discharge valves 122, 124.

Swing and makeup accumulators 108, 110 may each embody pressure vessels filled with a compressible gas that are configured to store pressurized fluid for future use by swing motor 49. The compressible gas may include, for example, nitrogen, argon, helium, or another appropriate compressible gas. As fluid in communication with swing and makeup accumulators 108, 110 exceeds pressures of accumulators 108, 110, the fluid may flow into accumulators 108, 110. Because the gas therein is compressible, it may act like a spring and compress as the fluid flows into swing and makeup accumulators 108, 110. When the pressure of the fluid within conduits 116, 118 drops below the pressures of swing and makeup accumulators 108, 110, the compressed gas may expand and urge the fluid from within swing and makeup accumulators 108, 110 to exit. It is contemplated that swing and makeup accumulators 108, 110 may alternatively embody membrane/spring-biased or bladder types of accumulators, if desired.

In the disclosed embodiment, swing accumulator 108 may be a larger (i.e., about 5-20 times larger) and higher-pressure (i.e., about 5-60 times higher-pressure) accumulator, as compared to makeup accumulator 110. Specifically, swing accumulator 108 may be configured to accumulate fluid having a pressure in a range of about 300 bar, while makeup accumulator 110 may be configured to accumulate about 20-25% as much fluid as swing accumulator 108 having a pressure in a range of about 5-30 bar. In this configuration, swing accumulator 108 may be used primarily to assist the motion of swing motor 49 and to improve machine efficiencies, while makeup accumulator 110 may be used primarily as a makeup accumulator to help reduce a likelihood of voiding at swing motor 49. It is contemplated, however, that other volumes and/or pressures may be accommodated by swing and makeup accumulators 108, 110, if desired.

Controller 100 may be configured to selectively cause swing accumulator 108 to charge and discharge, thereby improving performance of machine 10. In particular, a typical swinging motion of implement system 14 instituted by swing motor 49 may consist of segments of time during which swing motor 49 is accelerating a swinging movement of implement system 14, and segments of time during which swing motor 49 is decelerating the swinging movement of implement system 14. The acceleration segments may require significant energy from swing motor 49 that is conventionally realized by way of pressurized fluid supplied to swing motor 49 by pump 58, while the deceleration segments may produce significant energy in the form of pressurized fluid that is conventionally wasted through discharge to tank 60. Both the acceleration and deceleration segments may require swing motor 49 to convert significant amounts of hydraulic energy to swing kinetic energy, and vice versa. The pressurized fluid passing through swing motor 49 during deceleration, however, still contains a large amount of energy. If the fluid passing through swing motor 49 is selectively collected within swing accumulator 108 during the deceleration segments, this energy can then be returned to (i.e., discharged) and reused by swing motor 49 during the ensuing acceleration segments. Swing motor 49 can be assisted during the acceleration segments by selectively causing swing accumulator 108 to discharge pressurized fluid into the higher-pressure chamber of swing motor 49 (via discharge valve 124, passage 128, selector valve 120, and the appropriate one of first and second chamber conduits 84, 86), alone or together with high-pressure fluid from pump 58, thereby propelling swing motor 49 at the same or greater rate with less pump power than otherwise possible via pump 58 alone. Swing motor 49 can be assisted during the deceleration segments by selectively causing swing accumulator 108 to Charge with fluid exiting swing motor 49, thereby providing additional resistance to the motion of swing motor 49 and lowering a restriction and associated cooling requirement of the fluid exiting swing motor 49.

Controller 100 may be in communication with the different components of swing circuit 52 to regulate operations of machine 10. For example, controller 100 may be in communication with the elements of swing control valve 56 in swing circuit 52. Based on various operator input and monitored parameters, as will be described in more detail below, controller 100 may be configured to selectively activate swing control valve 56 in a coordinated manner to efficiently carry out operator requested movements of implement system 14.

Controller 100 may include a memory, a secondary storage device, a clock, and one or more processors that cooperate to accomplish a task consistent with the present disclosure. Numerous commercially available microprocessors can be configured to perform the functions of controller 100. It should be appreciated that controller 100 could readily embody a general machine controller capable of controlling numerous other functions of machine 10. Various known circuits may be associated with controller 100, including signal-conditioning circuitry, communication circuitry, and other appropriate circuitry. It should also be appreciated that controller 100 may include one or more of an application-specific integrated circuit (ASIC), a field-programmable gate array (FPGA), a computer system, and a logic circuit configured to allow controller 100 to function in accordance with the present disclosure.

The operational parameters monitored by controller 100, in one embodiment, may include a pressure of fluid within swing and/or boom circuits 52, 54. For example, one or more pressure sensors 102 may be strategically located within first chamber and/or second chamber conduits 84, 86 to sense a pressure of the respective passages and generate a corresponding signal indicative of the pressure directed to controller 100. It is contemplated that any number of pressure sensors 102 may be placed in any location within swing and/or boom circuits 52, 54, as desired. It is further contemplated that other operational parameters such as, for example, speeds, temperatures, viscosities, densities, etc. may also or alternatively be monitored and used to regulate operation of hydraulic circuit 50, if desired.

Boom circuit 54 may include, among other things, a boom control valve 202 modulated by controller 100 to regulate a flow of pressurized fluid from pump 58 to hydraulic cylinders 28 and from hydraulic cylinders 28 to tank 60. This fluid regulation may function to cause a lifting or lowering movement of work tool 16 about the associated horizontal axis (referring to FIG. 1) in accordance with an operator request received via input device 48.

Hydraulic cylinders 28 may each embody a linear actuator having a tubular housing and a piston assembly arranged to form two separated pressure chambers (e.g., a head chamber and a rod chamber) within the housing. The pressure chambers may be selectively supplied with pressurized fluid and drained of the pressurized fluid to cause the piston assembly to displace within the tubular housing, thereby changing an effective length of hydraulic cylinders 28. The flow rate of fluid into and out of the pressure chambers may relate to a velocity of hydraulic cylinders 28, while a pressure differential between the two pressure chambers may relate to a force imparted by hydraulic cylinders 28 on the associated linkage members. The expansion and retraction of hydraulic cylinders 28 may function to lift and lower work tool 16 relative to work surface 26.

Boom control valve 202 may be connected to hydraulic cylinders 28 by way of a head-end passage 206 and a rod-end passage 208. Based on an operating position of boom control valve 202, one of head- and rod-end passages 206, 208 may be connected to pump 58 via boom control valve 202, while the other of head- and rod-end passages 206, 208 may be simultaneously connected to tank 60 via boom control valve 202, thereby creating the pressure differential across the piston assembly within hydraulic cylinders 28 that causes extension or retraction thereof. A significant pressure differential may generally exist between the head and rod chambers during a lifting or lower movement of work tool 16, particularly during a lowering movement when work tool 16 is heavily loaded. That is, during the lowering movement, head-end passage 206 may carry fluid having a much higher pressure than fluid carried within rod-end passage 208 at that same time.

Pump 58 may produce a stream of pressurized fluid having a pressure level and/or a flow rate determined, at least in part, by demands of the actuators within boom circuit 54 that correspond with operator requested movements. A check valve 216 may be disposed within discharge passage 82, between pump 58 and boom control valve 202, if desired, to provide for a unidirectional flow of pressurized fluid from pump 58 into boom circuit 54. Discharge passage 82 may be connected within boom circuit 54 to head- and rod-end passages 206, 208 via boom control valve 202.

Boom control valve 202, in the disclosed exemplary embodiment, may be substantially identical to swing control valve 56. In particular, boom control valve 202 may have elements that are movable to control the extension and retraction of hydraulic cylinders 28 and corresponding lifting and lowering motions of implement system 14. Specifically, boom control valve 202 may include a head-end supply element 218, a head-end drain element 220, a rod-end supply element 222, and a rod-end drain element 224 all disposed within a common block or housing 226. Head- and rod-end supply elements 218, 222 may be connected in parallel to discharge passage 82 to regulate filling of their respective chambers with fluid from pump 58, while head- and rod-end drain elements 220, 224 may be connected in parallel to a return passage 228 to regulate draining of the respective chambers of fluid to tank 60. A makeup valve 230, for example a check valve, may be disposed between return passage 228 and an outlet of head-end drain element 220 and between return passage 228 and an outlet of rod-end drain element 224.

To extend hydraulic cylinders 28, head-end supply element 218 may be shifted to allow pressurized fluid from pump 58 to enter the head chamber of hydraulic cylinders 28 via discharge passage 82 and head-end passage 206, while rod-end drain element 224 may be shifted to allow fluid from the rod chamber to drain into tank 60 via rod-end passage 208 and return passage 228. To retract hydraulic cylinders 28, rod-end supply element 222 may be shifted to communicate the rod chamber with pressurized fluid from pump 58, while head-end drain element 220 may be shifted to allow draining of fluid from the head chamber into tank 60. It is contemplated that both the supply and drain functions of boom control valve 202 (i.e., of the four different supply and drain elements) may alternatively be performed by a single valve element associated with the head chamber and a single valve element associated with the rod chamber, or by a single valve element associated with both the head and rod chambers, if desired.

Supply and drain elements 218-224 of boom control valve 202 may be solenoid-movable against a spring bias in response to a flow rate and/or position command issued by a controller 100. In particular, hydraulic cylinders 28 may extend and retract at velocities that correspond with the flow rates of fluid into and out of the head and rod chambers. Accordingly, to achieve an operator-desired lift speed, a command based on an assumed or measured pressure drop may be sent to the solenoids (not shown) of supply and drain elements 218-224 that causes them to open an amount corresponding to the necessary fluid flow rates at hydraulic cylinders 28. This command may be in the form of a flow rate command or a valve element position command that is issued by controller 100. It is contemplated that one or more of valves 218-224 could alternatively be pilot operated and/or pilot assisted, if desired.

In some embodiments, a pressure compensator 232 may be included within boom circuit 54 and associated with boom control valve 202. In the disclosed example, pressure compensator 232 is disposed within discharge passage 82 at a location upstream of boom control valve 202. In this location, pressure compensator 232 may be configured to supply a substantially constant flow rate of fluid to boom control valve 202 during fluctuations in supply pressure caused by interaction of boom circuit 54 with swing circuit 52 and/or circuit 55.

Like swing circuit 52, boom circuit 54 may also be fitted with an energy recovery module (ERM) 234 that is configured to selectively extract and recover enemy from waste fluid that is discharged by hydraulic cylinders 28. ERM 234 may include, among other things, a boom accumulator 236 configured to selectively communicate with hydraulic cylinders 28 via a first charge valve 238 and a second charge valve 240, and a motor 241 selectively driven by the accumulated fluid. A passage 242 may extend from head-end passage 206 through charge valve 238 to boom accumulator 236, and a passage 244 may extend from return passage 228 through charge valve 240 to boom accumulator 236 (and between accumulator 236 and an inlet of motor 241). One or more check valves 246 may be disposed within passages 242 and/or 244 to promote unidirectional fluid flows into boom accumulator 236 and or out of return passage 228, respectively. First and second charge valves 238, 240 may be selectively movable in response to commands from controller 100 to fluidly communicate head-end passage 206 and/or return passage 228 with boom accumulator 236 for fluid charging purposes. Similarly, second charge valve 240 may be selectively movable to fluidly communicate boom accumulator 236 with the inlet of motor 241 for discharging purposes.

Boom accumulator 236 of boom circuit 54 may be similar to swing and makeup accumulators 108, 110 of swing circuit 52. In particular, boom accumulator 236 may embody a pressure vessel filled with a compressible gas that is configured to store pressurized fluid for future use by hydraulic cylinders 28. The compressible gas may include, for example, nitrogen, argon, helium, or another appropriate compressible gas. As fluid in communication with boom accumulator 236 exceeds a pressure of boom accumulator 236, the fluid may flow into boom accumulator 236. Because the gas therein is compressible, it may act like a spring and compress as the fluid flows into boom accumulator 236. When the pressure of the fluid within passage 244 drops below the pressure of boom accumulator 236, the compressed gas may expand and urge the fluid from within boom accumulator 236 to exit. It is contemplated that boom accumulator 236 may alternatively embody a membrane/ spring-biased or bladder type of accumulator, if desired.

In the disclosed embodiment, boom accumulator 236 may be about the same size as or smaller than swing accumulator 108, but configured to hold fluid at a lower pressure. Specifically, boom accumulator 236 may have a volume of about 50-100 L, and be configured to accommodate pressures of about 80-150 bar. It is contemplated, however, that other volumes and pressures may be accommodated by boom accumulator 236, if desired.

Each of first and second charge valves 238, 240 may be a solenoid-operated, variable position, 2-way valve that is movable in response to a command from controller 100 to allow fluid to enter boom accumulator 236 from the respective passages and for fluid from boom accumulator 236 to enter motor 241 via passage 244. In particular, each charge valve 238, 240 may include a valve element that is movable from a first position (shown in FIG. 2) at which fluid flow is inhibited, toward a second position (not shown) at which fluid may freely enter and/or leave boom accumulator 236 substantially unrestricted by the valve element. When the valve element is away from the first position (i.e., in the second position or in an intermediate position between the first and second positions) and a fluid pressure in the respective passages exceeds a fluid pressure within boom accumulator 236, the fluid may move into and fill (i.e., charge) boom accumulator 236. Likewise, when the valve element of charge valve 240 is in the second or intermediate position and the pressure within boom accumulator 236 exceeds the pressure within passage 244, the fluid may exit boom accumulator 236 and pass to motor 241 via passage 244. The valve element may be spring-biased toward the first position and movable in response to a command from controller 100 to any position between the first and second positions to thereby vary a flow rate of fluid into boom accumulator 236.

In some embodiments, a pressure relief arrangement 247 may be associated with boom accumulator 236. Pressure relief arrangement 247 may include a pressure relief valve 248 disposed in parallel with a restriction 250, both located between boom accumulator 236 and tank 60. Pressure relief valve 248 may be normally closed, but selectively moved to a flow-passing position to relieve fluid pressures within boom accumulator 236. Restriction 250 may be configured to continuously leak some fluid from boom accumulator 236 to tank 60. An additional pressure sensor 102 may be associated with boom accumulator 236, at a location between boom accumulator 236 and pressure relief arrangement 247 to generate corresponding pressure signals directed to controller 100.

A bypass arrangement 245 may extend between passages 242 and 244. Bypass arrangement 245 may include a bypass control valve 249 disposed within a bypass passage 251. Bypass control valve 249 may be a solenoid-operated, variable position, 2-way valve that is movable in response to a command from controller 100 to allow fluid from hydraulic cylinder 28 to selectively bypass accumulator 236 and flow directly to motor 241. In particular, control valve 249 may include a valve element that is movable from a first position (shown in FIG. 2) at which fluid flow through the respective valve is inhibited, toward a second position (not shown) at which fluid may freely flow substantially unrestricted from passage 242 to 244 without ever entering or exiting accumulator 236. The valve element may be spring-biased toward the first position, and movable in response to a command from controller 100 to any position between the first and second positions to thereby vary a flow rate of fluid through bypass passage 251. It may be desirable to bypass accumulator 236, for example, when accumulator 236 is already full of pressurized fluid, the fluid being discharged from hydraulic cylinders 28 is less than a pressure of accumulator 236 yet still high enough to drive motor 241, and/or there is an immediate need for power at motor 241 and accumulator 236 has an insufficient supply of accumulated fluid.

Motor 241 may function to convert energy stored in the form of pressurized fluid in boom accumulator 236 (and/or energy in the form of pressurized fluid discharged from hydraulic cylinders 28 via bypass passage 251) to mechanical energy. Specifically, motor 241 may be fluidly connected in parallel to both return passage 228 (downstream of check valve 246) and to boom accumulator 236 via passage 244 and charge valve 240. In this configuration, fluid from either passage may be directed through motor 241 and thereby used to drive motor 241.

Motor 241, in the depicted example, is a variable displacement hydraulic motor that is mechanically coupled to engine 59, to an input shaft of pump 58, and/or to another rotary device. By way of this coupling, motor 241, when driven by pressurized fluid, may mechanically assist engine 59 (e.g., to add power to an already rotating output of engine 59 or to assist in starting engine 59), pump 58, and/or the other rotary device. Motor 241 may assist pump 58 and engine 59 when pump 58 has a positive displacement or, alternatively assist only engine 59 when pump 58 has a neutral displacement. In addition, in some embodiments, engine 59 may selectively drive motor 241 to increase a pressure of the fluid directed through motor 241 and recirculated back to hydraulic cylinders 28.

One or more motor control valves may be associated with an outlet of motor 241 and used to regulate operation of motor 241. In the disclosed embodiment, three different control valves are shown, including a tank control valve 252, a rod-end control valve 254, and a head-end control valve 256 all connected in parallel to the outlet of motor 241. Tank control valve 252 may be situated between motor 241 and tank 60, within a drain passage 258. Rod-end control valve 254 may be situated between motor 241 and rod-end passage 208, within a rod-end return passage 260. Head-end control valve 256 may be situated between motor 241 and head-end passage 206 (e.g., via passage 242), within a head-end return passage 262. One or more check valve 264 may be associated with one or more of passages 258-262 to help ensure unidirectional flows within these passages.

Each of control valves 252-256 may be a solenoid-operated, variable position, 2-way valve that is movable in response to a command from controller 100 to allow fluid from motor 241 to enter tank 60, the head-end of hydraulic cylinders 28, or the rod-end of hydraulic cylinders 28, thereby accomplishing different purposes. In particular, each control valve 252-256 may include a valve element that is movable from a first position (shown in FIG. 2) at which fluid flow through the respective valve is inhibited, toward a second position (not shown) at which fluid may freely flow unrestricted by the corresponding valve element. The valve element may be spring-biased toward the first position, and movable in response to a command from controller 100 to any position between the first and second positions to thereby vary a flow rate and/or pressure of fluid through the respective valve. It is contemplated that one or more of valves 252-256 could alternatively be pilot operated and/or pilot assisted, if desired.

Any one or more of control valves 252-256 may be independently and/or simultaneously operable (i.e., moved to the second or an intermediate position) to accomplish different purposes. For example, to extract a maximum amount of energy from the fluid passing through motor 241 (e.g., during an engine starting event), a maximum pressure drop should be generated across motor 241. This maximum pressure drop may occur when the pressure downstream of motor 241 is lowest. In most situations, the maximum pressure drop may occur when only tank control valve 252 is used, and the corresponding element moved completely to the second position. In some situations, however, a greater pressure drop may be generated by using one of rod- and head-end control valves 254, 256 alone or together with tank control valve 252. This may be the case, for example, during an overrunning condition, when the expanding chamber of hydraulic cylinder 28 generates a negative pressure therein. Similarly, when fluid draining from the head-end chamber of hydraulic cylinders 28 passes through motor 241, only a portion of that fluid can be consumed by the rod-end chamber of hydraulic cylinders 28 due to geometric differences between the chambers. In this situation, some of the fluid may be directed into tank 60 via tank control valve 252, while the remaining fluid may be passed to the rod-end chamber via rod-end control valve 254. Rod- and head-end control valves 254, 256 may not normally be used together.

When using one of rod- and head-end control valves 254, 256, the fluid passing through motor 241 may be directed back to hydraulic cylinders 28. This may accomplish several purposes. For example, energy associated with the fluid passing through motor 241 may first be recovered and used to drive engine 59 and/or pump 58, thereby improving an efficiency of machine 10. Alternatively, after imparting energy to motor 241, the fluid may be used for internal regeneration within hydraulic cylinders 28 that helps to reduce voiding. The energy removed by motor 241 prior to fluid recirculation back to hydraulic cylinders 28 may not be needed within hydraulic cylinders 28 during an overrunning condition, as the returning fluid may only be used in this situation to inhibit voiding and not used to move hydraulic cylinders 28. Further, pump 58 may not be required to expend as much energy to provide fluid to hydraulic cylinders 28 during the overrunning condition. Finally, motor 241 may be capable of further increasing the pressure of the fluid being redirected back to hydraulic cylinders 28 during a non-overrunning condition, when motor 241 is being driven by engine 59.

In some embodiments, an additional pressure relief valve 266 may be associated with the outlet of motor 241. Pressure relief valve 266 may be disposed between motor 241 and return passage 228. Pressure relief valve 266 may normally be closed, but selectively moved to a flow-passing position to relieve fluid pressures downstream of motor 241 (e.g., when motor 241 increases a pressure of the fluid passing therethrough). An additional pressure sensor 102 may be associated with motor 241, and positioned at a location between motor 241 and pressure relief valve 266 to generate corresponding pressure signals directed to controller 100. Based on these pressure signals, controller 100 may be able to properly control operation of valves 252-256.

Swing and boom circuits 52, 54 may be interconnected for flow sharing, energy recuperation, and/or engine starting purposes. For example, a common return passage 268 may extend between swing and boom circuits 52, 54. Common return passage 268 may connect return passage 88 from swing circuit 52 with return passage 228 from boom circuit 54. In this manner, makeup accumulator 110 may be filled with fluid from both circuits 52, 54 and, likewise, makeup accumulator 110 may provide fluid to both circuits 52, 54 and to motor 241 via check valve 246. Finally, a common accumulator passage 272 may extend from swing accumulator 108 of swing circuit 52 to connect with passage 244 of boom circuit 54, and a control valve 270 may be disposed within passage 272 to regulate flows of fluid between circuits 52, 54. With this configuration, pressurized fluid from swing accumulator 108 may be passed to boom accumulator 236 via common accumulator passage 272, valve 270, passage 244, and second charge valve 240, and vice versa. Likewise, pressurized fluid from swing accumulator 108 may be passed through and converted to mechanical energy by motor 241 via common accumulator passage 272, valve 270, and passage 244 (e.g., during an engine starting event). In the disclosed embodiment, valve 270 is a solenoid-operated valve that is pilot-assisted (e.g., internally pilot assisted with high pressure fluid from swing accumulator 108).

In some embodiments, an accumulator return passage (not shown) may be included and used to connect an outlet of motor 241 with common accumulator passage 272 to direct high-pressure fluid exiting motor 241 into swing circuit 52 (e.g., into swing accumulator 108) and/or into boom circuit 54 (e.g., into boom accumulator 236). A control valve (e.g., one of motor, head-end, rod-end control valves or another separate control valve) may disposed within the common accumulator return passage, and be movable to direct the return fluid into the desired circuit(s).

Controller 100 may be configured to selectively cause boom accumulator 236 to charge and discharge, thereby improving performance of machine 10. In particular, a motion of implement system 14 instituted by hydraulic cylinders 28 may consist of segments of time during which hydraulic cylinders 28 are lifting implement system 14, and segments of time during which hydraulic cylinders are lowering implement system 14. The lifting segments may require significant energy from hydraulic cylinders 28 that is conventionally realized by way of pressurized fluid supplied to hydraulic cylinders 28 by pump 58, while the lowering segments may produce significant energy in the form of pressurized fluid that is conventionally wasted through discharge to tank 60. Both the lifting and lowering segments may require hydraulic cylinders 28 to convert significant amounts of hydraulic energy to kinetic energy, and vice versa. The pressurized fluid passing through hydraulic cylinders 28 during lowering, however, still contains a large amount of energy. If the fluid discharged from hydraulic cylinders 28 is selectively collected within boom accumulator 236 during the lowering segments, this energy can then be returned to (i.e., discharged) and reused by hydraulic cylinders 28 during the ensuing lifting segments. Pump 58 (and engine 59) can be assisted during the lifting segments by selectively causing boom accumulator 236 to discharge pressurized fluid through motor 241 (via second charge valve 240 and passage 244), thereby driving pump 58 at the same or greater rate with less engine power than otherwise possible.

In an alternative embodiment, controller 100 may be configured to additionally or alternatively direct the fluid discharged from boom accumulator 236 during lowering of implement system 14 (or at any other time) into swing circuit 52 (e.g., into swing accumulator 108) to assist movements of swing motor 49. Likewise, controller 100 may be configured to additionally or alternatively direct fluid discharged from swing accumulator 108 into boom accumulator 236 and/or through motor 241. Similarly, controller 100 may additionally or alternatively direct fluid discharged from motor 241 into one or both of swing and boom accumulators 108, 236.

Controller 100 may also be configured to implement a version of peak shaving in association with boom circuit 54. For example, controller 100 may be configured to cause boom accumulator 236 to charge with fluid exiting pump 58 (e.g., via control valve 202, head-end passage 206, passage 242, check valve 246, and first charge valve 238) when pump 58 and engine 59 have excess capacity (i.e., a capacity greater than required by boom circuit 54 to move work tool 16 as requested by the operator) during a lifting mode of operation. During this charging, it may be necessary to restrict the outlet flow of hydraulic cylinders 28 to less than the full flow rate of fluid from pump 58, such that the remaining flow may be forced into boom accumulator 236. Then, during times when pump 58 and/or engine 59 have insufficient capacity to adequately power hydraulic cylinders 28, the high-pressure fluid previously collected from pump 58 within boom accumulator 236 may be discharged through motor 241 in the manner described above to assist engine 59 and pump 58.

Controller 100 may further be configured to implement peak shaving in connection with both of swing and boom circuits 52, 54. In particular, excess fluid from pump 58 may be directed, by way of common accumulator passage 272 between circuits and stored within either of swing or boom accumulators 108, 236.

In some embodiments, an electric starting motor 274 may be used alone or in conjunction with motor 241 to start engine 59. Starting motor 274 may be supplied with power from an onboard battery (not shown), regulated by controller 100, and connected to engine 59 in any conventional manner.

Figure 3:
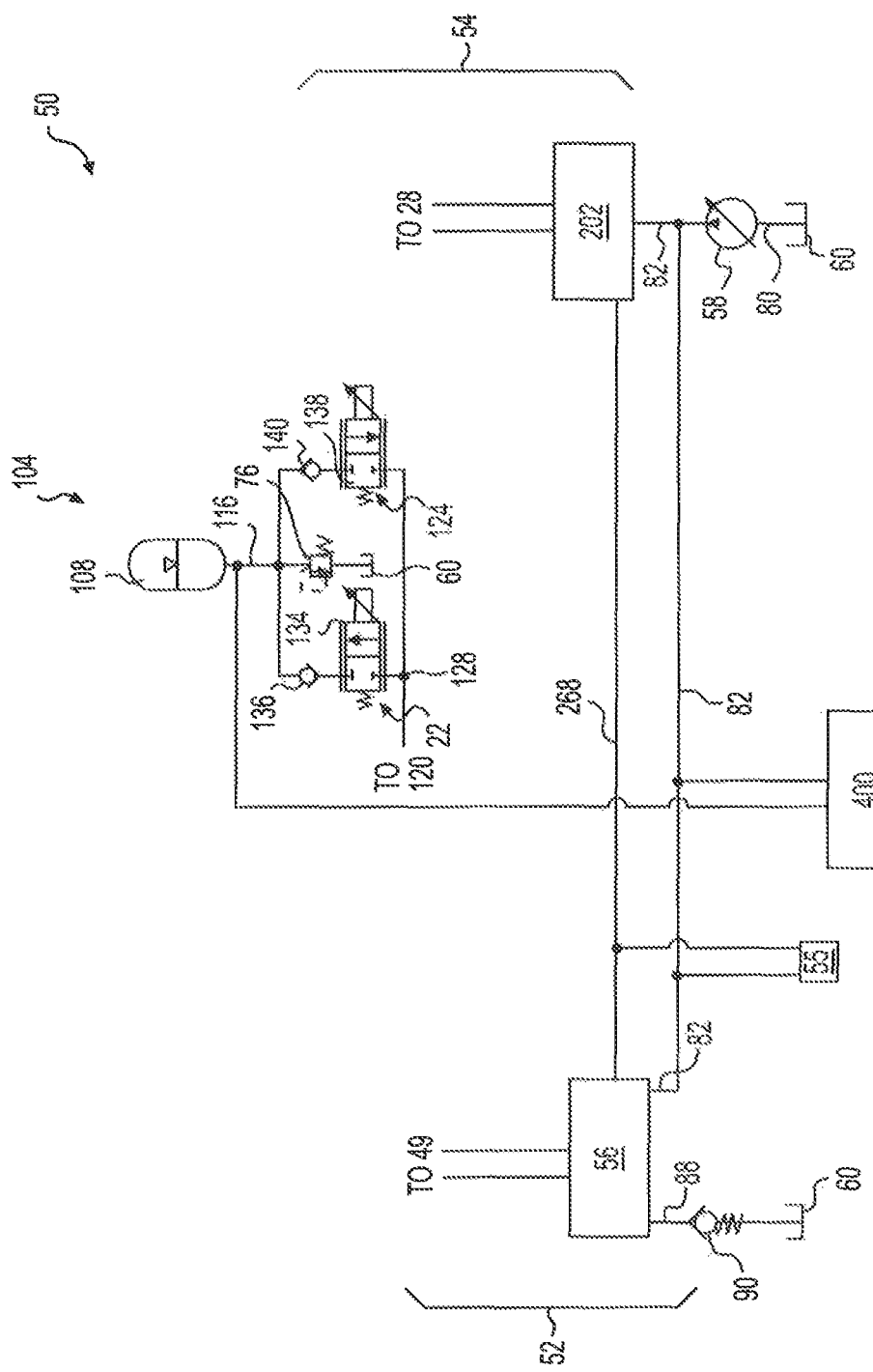
FIGS. 3-5 are schematic illustrations of optional exemplary disclosed valve arrangements that may be used in conjunction with the implement system of FIG. 2.
Figure 4:
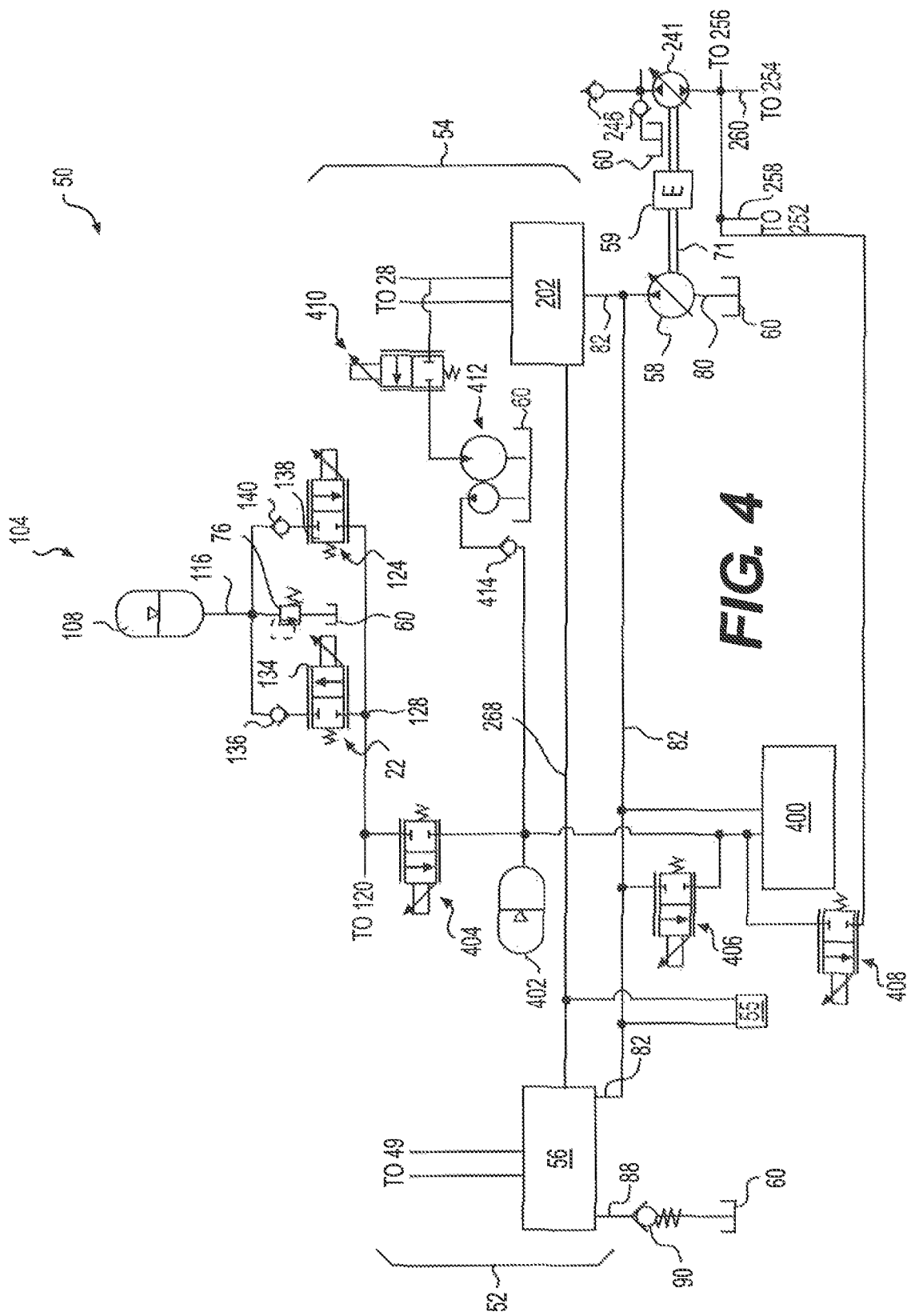
Figure 5:
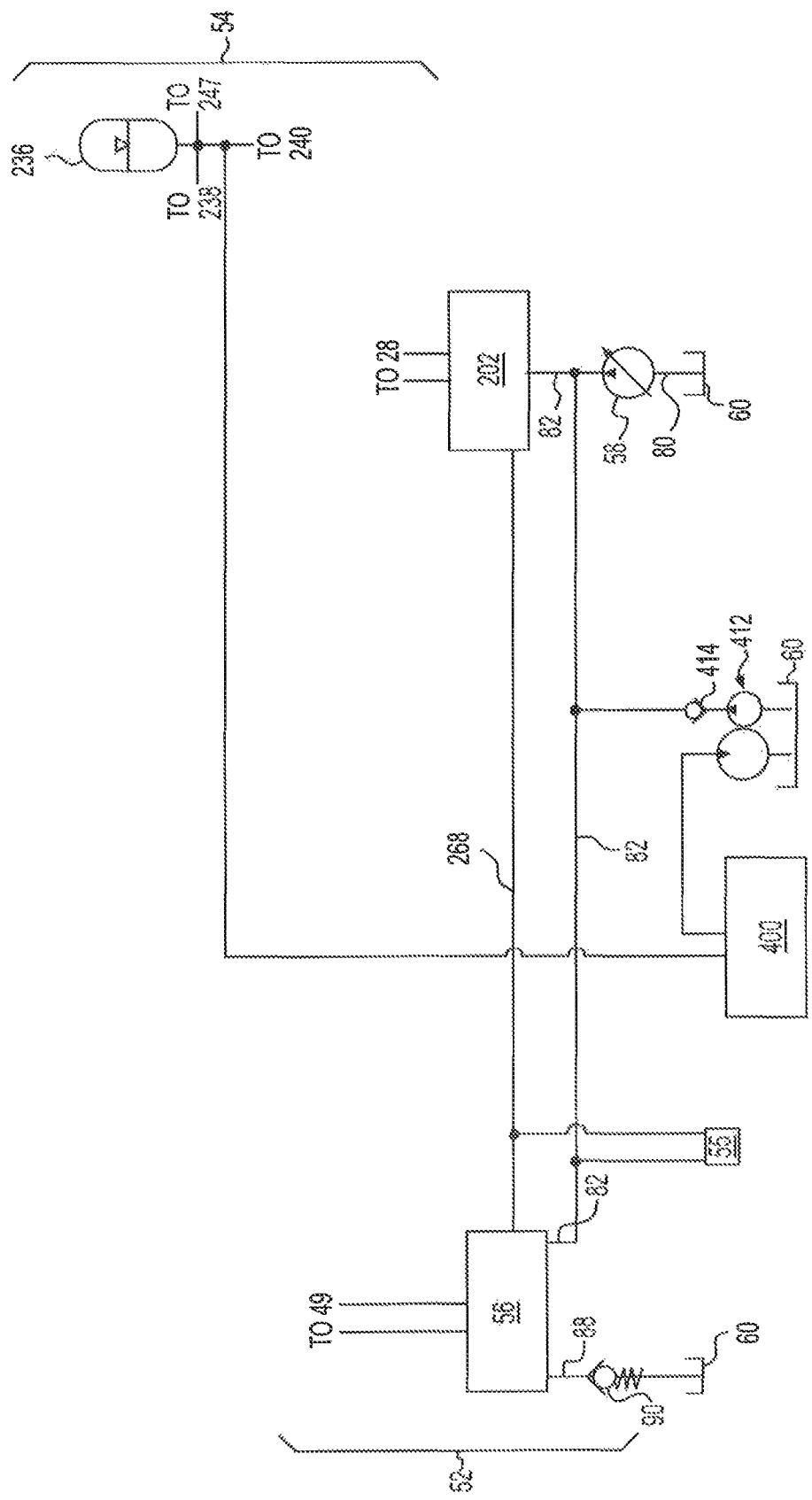

As will be described in more detail below, there may be times when engine 59 is shut down and the operator requests movement of work tool 16. When this occurs, it may be possible for the movement to be accommodated through use of accumulated high-pressure fluid while engine 59 remains shutdown and/or while engine 59 is being started. FIGS. 3-5 are simplified illustrations of hydraulic circuit 50 depicting different configurations that could be used to control this functionality.

As shown in the simplified illustration of FIG. 3, a control valve 400 may be used to selectively control flows of fluid from swing accumulator 108 to any one of hydraulic cylinders 28, 36, 38 and/or swing motor(s) 49 ("the actuators") when engine 59 is shutdown and/or being started. During these situations, when the operator of machine 10 manipulates input device 48 to request movement of the actuators, pressurized fluid from swing accumulator 108 may be provided to the corresponding circuits (52, 54, 55) of the particular actuators via control valve 400 (e.g., by way of discharge passage 82). During engine operation, as long as pressurized fluid is available within swing accumulator 108, fluid directed to the actuators may come from pump 58 alone, from swing accumulator 108 alone, or from a combination of the different sources. When pressurized fluid is not available within swing accumulator 108 and engine 59 is operational, the required fluid may be provided by pump 58 alone. High-pressure fluid from pump 58 may be selectively used to charge swing accumulator 108 via valve 400 any time pump 58 has excess capacity. Fluid being discharged from swing motor 49 may likewise be directed into swing accumulator 108 (e.g., via valve 134), as long as the fluid has a sufficiently high pressure. Otherwise, the fluid discharged from the swing motor 49 may be directed to tank 60 via valve 56 and passage 88 or via passage 268, motor 241 (referring to FIG. 2), and valve 252.

FIG. 4 illustrates another embodiment, in which accumulated fluid can be used to power any one of hydraulic cylinders 28, 36, 38 and/or swing motor(s) 49 ("the actuators") when engine 59 is shutdown and/or being started (i.e., when pump 58 is not pressurizing fluid or pressurizing too little fluid). In the embodiment of FIG. 4, hydraulic circuit 50 includes an additional accumulator (e.g., a startup accumulator) 402 that supplies previously collected high-pressure fluid through control valve 400 to discharge passage 82. Accumulator 402 may have a size and/or a pressure larger than swing and boom accumulators 108, 236. For example, accumulator 402 may be configured to collect 35 L or more of fluid having a pressure of about 350 bar or higher.

The fluid collected within accumulator 402 may come from any combination of different sources. For example the fluid may be directed from swing circuit 52 (e.g., from motor 49 and/or swing accumulator 108) through a valve 404 into accumulator 402. Additionally or alternatively, the fluid may be directed into accumulator 402 from discharge passage 82 (i.e., from pump 58) via a valve 406, and/or from motor 241 via a valve 408. Finally, the fluid may be directed into accumulator 402 from boom circuit 54 (e.g., from hydraulic cylinders 28 and/or boom accumulator 236) via a valve 410. Because the pressures within boom circuit 54 may generally be lower than required within accumulator 402, the fluid from boom circuit 54 may first be directed through an intensifier 412 and a check valve 414 before being directed into accumulator 402. Intensifier 412 may essentially consist of a motor element coupled with a pump element, the motor element being driven by the pressurized fluid from boom circuit 54 to power the pump element and pressurize fluid from tank 60 to an even higher pressure. Valves 404-410 may be substantially identical, and include a proportional valve element that is solenoid operable against a spring bias to any position between a completely closed position and a completely open position.

FIG. 5 illustrates yet another embodiment, in which fluid accumulated within boom circuit 54 can be used to power any one of hydraulic cylinders 28, 36, 38 and/or swing motor(s) 49 ("the actuators") when engine 59 is shutdown and/or being started (i.e., when pump 58 is not pressurizing fluid or pressurizing too little fluid). In the embodiment of FIG. 5, hydraulic circuit 50 does not require additional accumulator 402, but instead uses boom accumulator 236 (similar to the way that the embodiment of FIG. 3 utilizes swing accumulator 108). For example, control valve 400 may be configured to receive fluid from boom accumulator 236, and selectively direct the fluid through intensifier 412 and check valve 414 into discharge passage 82.

Control valve 400 from any of the embodiments of FIGS. 3-5, may take on any form known in the art. For example control valve 400 could embody a solenoid-operated proportional control valve movable to any position between a closed position and a fully open position. And the movement of control valve 400 may be controlled based on a desired flow rate of fluid into and/or out of the actuators, a measured pressure of accumulated fluid, and/or monitored operational conditions of pump 58. In another embodiment, control valve 400 could be a load-sense valve, wherein the flow rate of fluid may be regulated based on a pressure of the fluid passing through control valve 400 and a pressure of the fluid being discharged by pump 58. In yet another embodiment, control valve 400 may be pressure-compensated. Specifically, control valve 400 could include a pressure compensating element that moves to help ensure that the flow rate of fluid passing through valve 400 (for a given opening area) remains substantially constant and reliable regardless of fluctuations in pressure.

Figure 6:
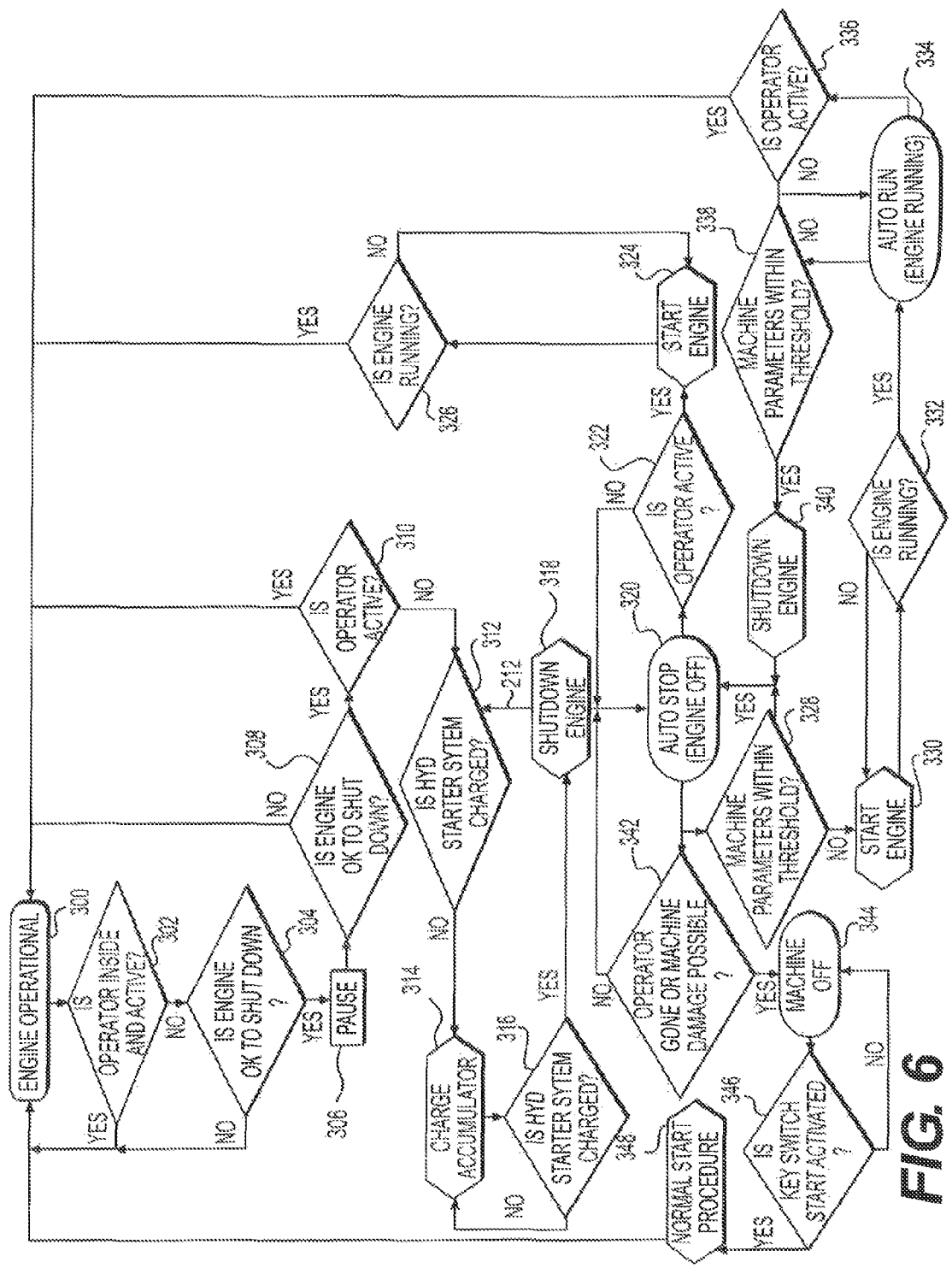
FIGS. 6 and 7 are flowcharts illustrating exemplary disclosed methods of engine control that may be performed by the implement system of FIG. 2.
Figure 7:
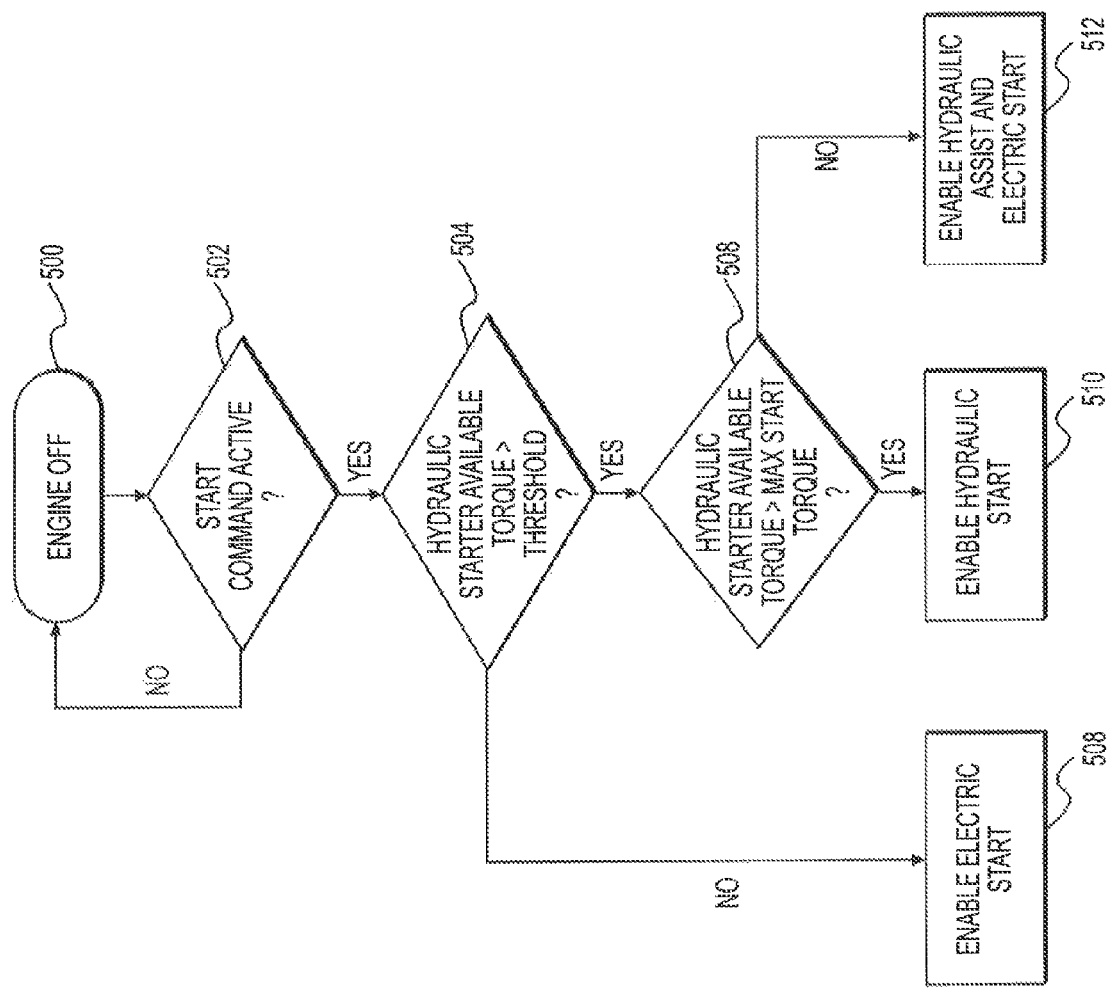

FIGS. 6 and 7 illustrate different methods of engine and hydraulic circuit control. FIGS. 6 and 7 will be described in more detail below to further illustrate the disclosed concepts.

INDUSTRIAL APPLICABILITY

The disclosed hydraulic circuit may be applicable to any machine that performs a substantially repetitive work cycle, which involves swinging and/or lifting movements of a work tool. The disclosed hydraulic circuit may help to improve machine performance and efficiency by assisting movements of the work tool with accumulators during different segments of the work cycle. In addition, the disclosed hydraulic circuit may help to improve machine efficiency by capturing and reusing otherwise wasted energy in a number of different ways, including restarting the associated engine when shut down during idle periods. Control of hydraulic circuit 50 will now be described in detail.

During operation of machine 10, engine 59 may drive pump 58 to draw fluid from tank 60 and pressurize the fluid. The pressurized fluid may be directed, for example, into the head-end chambers of hydraulic cylinders 28 via head-end supply element 218, while at the same time fluid may be allowed to flow out of the rod-end chambers of hydraulic cylinders 28 via rod-end drain element 224. This operation may cause hydraulic cylinders 28 to extend and raise boom 24.

In some applications, fluid previously collected within boom accumulator 236 may assist the raising of boom 24. For example, pressurized fluid from within boom accumulator 236 may be directed through charge valve 240 and passage 244 to motor 241. This fluid may be further pressurized by motor 241, and directed to the head-end chambers of hydraulic cylinders 28 via head-end control valve 256 and passage 262. This fluid may supplement the supply of fluid from pump 58 or may be the sole source of fluid used to raise boom 24, as desired. Because the fluid within boom accumulator 236 may be pressurized to some extent already, the energy required to further pressurize the fluid may be less than required by pump 58 to fully pressurize fluid drawn from tank 60. Accordingly, a savings may be realized by using fluid from boom accumulator 236 to help raise boom 24.

Similarly, the fluid being discharged from the rod-end chambers of hydraulic cylinders 28 may be selectively collected within boom accumulator 236 and/or used to drive motor 241. That is, in some applications, the fluid being discharged from hydraulic cylinders 28 may have an elevated pressure. For example, when boom 24 is engaged with work surface 26 and a portion of frame 42 is raised away from work surface 26, the weight of machine 10 may pressurize fluid being discharged from the rod-end chambers during raising of boom 24 (i.e., during lowering of frame 42). The pressurized fluid may be directed from rod-end drain element 224 through return passage 228, past check valve 246, and through motor 241 (i.e., to drive motor 241) or into passage 244 and boom accumulator 236 via charge valve 240. By driving motor 241 with the fluid, some energy contained within the fluid may be transferred to engine 59 and/or pump 58, thereby improving the efficiency of machine 10.

Lowering of boom 24 may be achieved in similar manner. In particular, fluid pressurized by pump 58 may be directed into the rod-end chambers of hydraulic cylinders 28 via rod-end supply element 222, while at the same time fluid may be allowed to flow out of the head-end chambers of hydraulic cylinders 28 via head-end drain element 220. This operation may cause hydraulic cylinders 28 to retract and lower boom 24.

In some applications, fluid previously collected within boom accumulator 236 may assist the lowering of boom 24. For example, pressurized fluid from within boom accumulator 236 may be directed through charge valve 240 and passage 244 to motor 241. This fluid may be further pressurized by motor 241 (or alternatively energy may be absorbed from this fluid by motor 241), and then directed to the rod-end chambers of hydraulic cylinders 28 via rod-end control valve 254 and passage 260. This fluid may supplement the supply of fluid from pump 58 or may be the sole source of fluid used to lower boom 24, as desired. As described above, reducing the load on pump 58 may improve the efficiency of machine 10.

Similarly, the fluid being discharged from the head-end chambers of hydraulic cylinders 28 may be selectively collected within boom accumulator 236 and/or used to drive motor 241. That is, in some applications, the fluid being discharged from hydraulic cylinders 28 may have an elevated pressure. For example, when boom 24 is loaded with material, the weight of the material (and of boom 24, stick 30, and work tool 16) acting through boom 24 may pressurize fluid being discharged from the head-end chambers of hydraulic cylinders 28 during lowering of boom 24. The pressurized fluid may be directed from the head-end chambers past check valve 246 and through charge valve 238 into boom accumulator 236. Additionally or alternatively, the fluid being discharged from the head-end chambers may be directed through passage 242, bypass control valve 249, and passage 244 to motor 241. This high-pressure fluid may then drive motor 241 to impart energy to engine 59 and/or pump 58.

FIG. 6 illustrates a control method used to selectively shut down and restart engine 59, to improve efficiencies of machine 10 during idle periods of time. As see in the flowchart of FIG. 6, control may initiate after engine 59 is already operational (Step 300). Controller 100 may then check to see if the operator is inside machine 10 and actively operating machine 10 (Step 302). Controller 100 may determine that the operator is inside machine 10 and actively operating machine 10 based on any number of parameters known in the art. For example, the operator may be determined to be inside station 22 based on activation of a seatbelt sensor, a door sensor, or another similar sensor, and actively operating machine 10 based on detected movement of input device 48. If the operator is inside machine 10 and actively operating machine 10, control may return to step 300.

When controller 100 determines that the operator is not inside machine 10 or inside but not actively operating machine 10 (e.g., for at least a minimum threshold period of time), controller 100 may check to see if it is ok to shut down engine 59 (Step 304). In some situations, shutting down engine 59 could cause damage to engine 59 and/or other machine components, or present undesired situations. These situations may occur when engine 59 is operating at a speed above or below a desired range, when an exhaust treatment device of engine 59 is undergoing a regeneration event, when a temperature of engine 59 falls outside of a desired range, when a battery level is too low to restart engine 59, etc. Controller 100 may determine if it is ok to shut down engine 59 by checking the status of these conditions. If controller 100 determines it is not ok to shut down engine 59, control may return to step 300. Otherwise, controller 100 may pause for a predetermined period of time (Step 306), and then perform the check again (Step 308) for redundancy purposes. In one embodiment, the pause may last for about 15 seconds. It is contemplated that steps 306 and 308 may be omitted, if desired.

Following step 308, controller 100 may check to see if the operator has become active during completion of steps 304-308 (Step 310). If the operator has initiated movement of input device 48 during this time, control may return to step 300. However, if at step 310, controller 100 determines that the operator has remained inactive, controller 100 may check to see if swing accumulator 108 has accumulated sufficient fluid to hydraulically restart engine 59 (Step 312). In particular, based on a pressure of fluid within swing accumulator 108, controller 100 may be able to determine (e.g., based on a map stored in memory) if a sufficient volume of fluid exists to restart engine 59. It should be noted that controller 100 may be configured to primarily use swing accumulator 108 to restart engine 59 due to the higher pressure capacity of swing accumulator 108. However, it may be possible in some embodiments, to alternatively or additionally use makeup accumulator 110, boom accumulator 236, and/or accumulator 402 to restart engine 59, if desired.

If controller 100 determines at step 312 that swing accumulator 108 (or any combination of the other accumulators) does not have enough fluid at the right pressure to restart engine 59, controller 100 may cause swing accumulator 108 to be charged (Step 314). As described above, swing accumulator 108 may be charged in any number of different ways, including by directing pressurized fluid from pump 58 into swing accumulator 108. Controller 100 may continue to check on the charge of swing accumulator 108 (Step 316), and then proceed to shut engine 59 down (Step 318) when sufficient charge has been detected.

When engine 59 is off (Step 320), controller 100 may continuously monitor at least three different things. For example, controller 100 may monitor the operator to determine if the operator has become active (Step 322), monitor machine parameters to see if they have deviated from desired levels (Step 328), and check to see if the operator has left station 22 or if machine 10 is experiencing unexpected problems (Step 342). Engine 59 may remain off, at step 320, as long as the operator remains inactive inside station 22, the machine parameters are within threshold limits, and no problems with machine 10 have been detected.

However, if at step 322, controller 100 determines that the operator has become active, controller 100 may cause engine 59 to restart (Step 324) and thereafter confirm operational status of engine 59 (Step 326). Control may loop from step 324 through step 326 until controller 100 confirms that engine 59 has been restarted. Control may then return to step 300.

At step 328, controller 100 may compare various machine parameters (e.g., battery levels, ambient temperatures, engine block temperatures, hydraulic pressures, etc.) to threshold levels, and selectively cause engine 59 to restart (Step 330) if any one or more of these parameters deviate from desired values. For example, if the battery of machine 10 nears a minimum voltage level required to restart engine 59, controller 100 may cause engine 59 to restart and charge the battery. Similarly, if ambient and/or engine block temperatures fall to levels that may make restarting of engine 59 difficult, controller 100 may cause engine 59 to restart. Controller 100 may then confirm operational status of engine 59 (Step 332), and control may loop from step 330 through step 332 until controller 100 confirms that engine 59 has been restarted.

When engine 59 has been successfully restarted (Step 334), controller 100 may again check to see if the operator is active (Step 336) and if the machine parameters are within the desired range (Step 338). As long as the operator remains inactive and the machine parameters are outside the desired range, controller 100 may keep engine 59 running (control may loop from step 334 through steps 336 and 338). From step 336, when controller 100 determines that the operator has become active, control may return to step 300. And from step 338, when the machine parameters return to within their desired range (and the operator is still inactive), engine 59 may be shut down again (Step 340), and control may return to step 320.

Each time that control returns to step 320, controller 100 may increment a counter and use the counter to determine if machine 10 is experiencing any problems. In particular, it may be possible for a problem with the battery of machine 10, with an engine block temperature sensor, or with another component to occur and cause engine 59 to repeatedly shut down. In this situation, controller 100 may be able to detect the malfunction based on the cycle count, and selectively respond to inhibit further machine damage from occurring. Specifically, at step 342, controller 100 may determine that further machine damage is possible (e.g., based on the count of shutdown events), and selectively shut all of machine 10 down (i.e., not just engine 59) (Step 344). It should be noted that controller 100 may be able to determine that further machine damage is possible in other ways, if desired. Controller 100 may also cause all of machine 10 to shut down at step 344 when the operator leaves station 22. Once all of machine 10 has been shut down, controller 100 may only allow machine 10 to restart when the operator manually requests such a restart (e.g., by way of a key switch) (Step 346). Thereafter, controller 100 may follow a normal start routine (Step 348), and control may return to step 300.

As described above, engine 59 may be restarted using electric start motor 274 alone, motor 241 alone, or both motors 241 and 274. In most engine restart situations, such as those described above with respect to the flowchart of FIG. 6, engine restart may be initiated primarily using motor 241 so as to extend the life of electric start motor 274 and the associated circuitry. The flowchart of FIG. 7 illustrates one exemplary way of determining how to restart engine 59.

As can be seen in FIG. 7, the method of FIG. 7 may initiate when engine 59 is off (Step 500) and a command to restart has been received (Step 502). The command to restart may come directly from the operator of machine 10 or, alternatively through completion of any number of different automated processes like that of FIG. 6. Regardless of the source of the restart command, when the command to restart is received, controller 100 may determine if sufficient hydraulic power exists within any one or more of accumulators 108, 110, 236, 402 to assist in starting engine 59 (Step 504). For example, controller 100 may reference an actual pressure of the fluid within swing accumulator 108 with a lookup map stored in memory to determine if a threshold amount of torque capacity exists. In other words, controller 100 may determine if the amount and pressure of the fluid within swing accumulator 108, when directed through motor 241, is enough to at least assist in starting engine 59. If the pressure of the fluid in swing accumulator 108 is below the threshold level (e.g., about 75 kPa), controller 100 may energize electric start motor 274 to start engine 59 without any assistance (Step 506).

If a minimum torque capacity exists to hydraulically assist the starting of engine 59 (i.e., if fluid having at least a minimum pressure has been accumulated within swing accumulator 108), then controller 100 may determine if enough torque capacity exists to start engine 59 with motor 241 alone. Specifically, controller 100 may reference the pressure of the fluid within swing accumulator 108 with the lookup map to determine if the torque capacity of motor 241, when fed with the accumulated fluid, is greater than a maximum torque capacity (Step 5508). If the torque capacity of motor 241 is greater than the maximum torque capacity (i.e., if the pressure of the fluid within swing accumulator 108 is greater than about 300 bar), then controller 100 may cause motor 241 to hydraulically restart engine 59 alone (Step 510). Otherwise, controller 100 may cause motor 241 to hydraulically assist electric starting motor 274 in starting engine 59 (Step 512).

Several benefits may be associated with the disclosed hydraulic circuit. For example, because the disclosed circuit may integrate swing and boom circuits during both energy recovery and reuse, a greater amount of energy may be stored and re-used. Further, because the disclosed system may utilize multiple different accumulators, the accumulators may be relatively small, inexpensive, and easy to package. In addition, the size and/or pressure capacity of each of the accumulators may be tailored to provide enhanced performance to each circuit it is connected to. Also, by separating the accumulators with different combinations of valves, the associated fluid may be stored, routed, pressure-enhanced, and/or converted in many different ways. Further, the ability to internally regenerate fluid associated with hydraulic cylinders 28, in combination with energy recovery via motor 241, even higher efficiencies may be realized. And finally, the ability to provide immediate actuator operation during engine shutdown and/or restart may enhance machine performance, and improve operator satisfaction by reducing perceived unresponsiveness of machine 10.

It will be apparent to those skilled in the art that various modifications and variations can be made to the disclosed implement system. Other embodiments will be apparent to those skilled in the art from consideration of the specification and practice of the disclosed implement system. It is intended that the specification and examples be considered as exemplary only, with a true scope being indicated by the following claims and their equivalents.

What is claimed is:
1. An implement system for a machine having an engine, comprising:
  a pump driven by the engine;
  a first actuator configured to receive pressurized fluid from the pump during operation of the engine;
  at least a second actuator configure to receive pressurized fluid from the pump during operation of the engine;
  an accumulator configured to receive pressurized fluid from the first actuator during operation of the engine and to discharge fluid to the first actuator and to the at least a second actuator when the engine is shut down; and
  a hydraulic motor connected to drive the engine, wherein the accumulator is further configured to receive pressurized fluid from the hydraulic motor.

2. The implement system of claim 1, wherein:
  the first actuator is a swing motor; and
  the at least a second actuator includes at least one of a boom cylinder, a stick cylinder, and a tool cylinder.

3. The implement system of claim 2, wherein the at least a second actuator includes a boom cylinder, a stick cylinder, and a tool cylinder.

4. The implement system of claim 3, wherein the accumulator is further configured to discharge fluid to the swing motor.

5. The implement system of claim 1, wherein:
  the first actuator is a boom cylinder; and
  the at least a second actuator includes at least one of a swing motor, a stick cylinder, and a tool cylinder.

6. The implement system of claim 5, wherein the at least a second actuator includes a swing motor, a stick cylinder, and a tool cylinder.

7. The implement system of claim 6, wherein the accumulator is further configured to discharge fluid to the boom cylinder.

8. The implement system of claim 1, wherein the accumulator is further configured to receive pressurized fluid from the at least a second actuator during operation of the engine.

9. The implement system of claim 8, further including an intensifier configured to increase a pressure of the fluid received by the accumulator from the at least a second actuator.

10. The implement system of claim 8, wherein:
  the accumulator is a first accumulator; and the implement system further includes a second accumulator configured to receive pressurized fluid from the first actuator and return pressurized fluid to the first actuator during operation of the engine.

11. The implement system of claim 10, wherein the implement system further includes a third accumulator configured to receive pressurized fluid from the at least a second actuator and return pressurized fluid to the at least a second actuator during operation of the engine.

12. The implement system of claim 11, further including a hydraulic motor connected to drive the engine, wherein:
the first accumulator is further configured to receive pressurized fluid from the hydraulic motor; and
the second and third accumulators are configured to supply pressurized fluid to the hydraulic motor.

13. The implement system of claim 12, wherein the hydraulic motor is further configured to supply pressurized fluid to the at least a second actuator.

14. The implement system of claim 1, further including an intensifier configured to increase a pressure of the fluid received by the accumulator from the first actuator.

15. The implement system of claim 14, further including a control valve disposed between the intensifier and at least one of the accumulator and the first actuator.

16. The implement system of claim 14, wherein:
the intensifier is disposed between the first actuator and the accumulator; and
the implement system further includes a control valve disposed between the first actuator and the intensifier.

17. The implement system of claim 1, wherein the accumulator is further configured to receive pressurized fluid from the pump during operation of the engine.

18. The implement system of claim 17, further including a hydraulic motor connected to drive the engine, wherein the accumulator is further configured to receive pressurized fluid from the hydraulic motor.

19. A machine, comprising:
a frame;
an engine mounted to the frame;
a boom;
a swing motor configured to swing the boom relative to the frame;
a boom cylinder configured to raise and lower the boom relative to the frame;
a stick;
a stick cylinder configured to pivot the stick relative to the boom;
a work tool;
a tool cylinder configured to pivot the work tool relative to the stick;
a common supply passage connected to the swing motor, the boom cylinder, the stick cylinder, and the tool cylinder;
a pump driven by the engine to supply pressurized fluid to common supply passage;
a swing accumulator configured to receive pressurized fluid from the swing motor and direct pressurized fluid back to the swing motor during operation of the engine;
a boom accumulator configured to receive pressurized fluid from the boom cylinder and direct pressurized fluid back to the boom cylinder during operation of the engine; and
a startup accumulator configured to receive pressurized fluid from at least one of the swing motor, the swing accumulator, the boom cylinder, and the boom accumulator during operation of the engine, and to direct pressurized fluid to the common supply passage when the engine is shut down or starting up.

20. An implement system for a machine having an engine, comprising:
a pump driven by the engine;
a first actuator configured to receive pressurized fluid from the pump during operation of the engine;
at least a second actuator configure to receive pressurized fluid from the pump during operation of the engine;
an accumulator configured to receive pressurized fluid from the first actuator during operation of the engine and to discharge fluid to the first actuator and to the at least a second actuator when the engine is shut down, wherein the accumulator is further configured to receive pressurized fluid from the at least a second actuator during operation of the engine; and
an intensifier configured to increase a pressure of the fluid received by the accumulator from the at least a second actuator.

* * * * *